United States Patent
Kumar

(10) Patent No.: US 10,853,186 B1
(45) Date of Patent: Dec. 1, 2020

(54) CONTENT INDEXED INTEGRATED COPY DATA BY INTEGRATING ELASTIC SEARCH AND STORAGE SYSTEM SNAPSHOT DIFFERENTIAL DATA

(71) Applicant: EMC IP Holding Company LLC, Hopkinton, MA (US)

(72) Inventor: Sunil Kumar, Kadugodi (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/783,235

(22) Filed: Oct. 13, 2017

(51) Int. Cl.
*G06F 11/14* (2006.01)
*H04L 29/08* (2006.01)
*G06F 11/20* (2006.01)
*G06F 16/22* (2019.01)

(52) U.S. Cl.
CPC ...... *G06F 11/1453* (2013.01); *G06F 11/2058* (2013.01); *G06F 16/22* (2019.01); *H04L 67/2814* (2013.01)

(58) Field of Classification Search
CPC ............. G06F 11/1453; G06F 11/2058; G06F 17/30312
USPC ................................................. 711/156, 162
See application file for complete search history.

(56) References Cited

U.S. PATENT DOCUMENTS

| | | | | |
|---|---|---|---|---|
| 8,751,515 B1* | 6/2014 | Xing | ............. | G06F 16/113 707/755 |
| 8,909,881 B2* | 12/2014 | Bunte | ............. | G06F 11/1451 711/161 |
| 9,697,228 B2* | 7/2017 | Subramanian | ...... | G06F 11/1435 |
| 2011/0029711 A1* | 2/2011 | Dhuse | ............. | G06F 11/1076 711/4 |
| 2013/0191349 A1* | 7/2013 | Akirav | ............. | G06F 16/1748 707/692 |
| 2014/0258236 A1* | 9/2014 | Vijayan | ............. | G06F 11/1448 707/639 |
| 2015/0074458 A1* | 3/2015 | Atluri | ............. | G06F 11/1453 714/19 |
| 2015/0142745 A1* | 5/2015 | Tekade | ............. | G06F 11/1451 707/646 |
| 2015/0143064 A1* | 5/2015 | Bhargava | ............. | G06F 11/1451 711/162 |
| 2015/0169413 A1* | 6/2015 | Ngo | ............. | G06F 11/1451 711/162 |
| 2016/0154707 A1* | 6/2016 | Kumarasamy | ............. | G06F 17/30088 707/649 |

(Continued)

FOREIGN PATENT DOCUMENTS

EP 3185474 A1 * 6/2017 ............. H04L 41/04

OTHER PUBLICATIONS

N. Zhu, Y. Lu, W. He and Y. Hua, "A Content-Based Indexing Scheme for Large-Scale Unstructured Data," 2017 IEEE Third International Conference on Multimedia Big Data (BigMM), Laguna Hills, CA, 2017, pp. 205-212, doi: 10.1109/BigMM.2017.51.*

*Primary Examiner* — Pierre Miche Bataille
(74) *Attorney, Agent, or Firm* — Warkman Nydegger

(57) ABSTRACT

One example method includes creating a copy of a dataset, wherein the dataset is a backup that was previously created and stored. The copy of the dataset may be a clone, or a snapshot. The method further includes indexing a portion of the copy, mounting the copy at a proxy, associating the index with data in the copy, storing the index, and then using the index to search the copy. The search may be performed in response to a request from a user.

19 Claims, 3 Drawing Sheets

(56) References Cited

U.S. PATENT DOCUMENTS

2017/0068601 A1* 3/2017 Nallathambi ..... G06F 17/30088
2017/0115907 A1* 4/2017 Kumarasamy ........ G06F 3/0619
2017/0206221 A1* 7/2017 Kumarasamy ........ G06F 16/113
2017/0300390 A1* 10/2017 Dornemann .......... G06F 16/275
2018/0260157 A1* 9/2018 Dornemann ........ G06F 11/1471

* cited by examiner

CONTENT INDEXED INTEGRATED COPY DATA BY INTEGRATING ELASTIC SEARCH AND STORAGE SYSTEM SNAPSHOT DIFFERENTIAL DATA

FIELD OF THE INVENTION

Embodiments of the present invention generally relate to copy data management. More particularly, at least some embodiments of the invention relate to systems, hardware, software, computer-readable media, and methods directed to the indexing of copy data.

BACKGROUND

Enterprises typically choose to protect their valuable data through the use of various types of copies, such as backups, clones, and snapshots. These copies may be generated by a backup application or other type of application, and then stored locally or at a remote site. While this copy functionality has proven useful, various technical problems nonetheless remain with conventional systems and processes for copy creation and management.

For example, the nature of the copies and associated processes is such that they are essentially a blackbox to the end user, as neither the administrator nor end user know what information is stored inside copies such as snapshots and clones. That is, conventional systems and processes present technical problems in that they do not expose either the nature or exact content of the data that is included in the copies.

That is, for an organization with a large number of copies, it may be difficult or impossible for an end to identify specific information or content, and its particular location, in the copies. Attempts to address this problem present yet other technical problems however. For example, in attempting to identify and locate particular content, the user is typically compelled to mount each of the copy data instances and then perform a manual search process, such as a keyword search for 'CustomerID' for example, of each mounted copy data instance. However, this approach involves a significant amount of time and effort.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
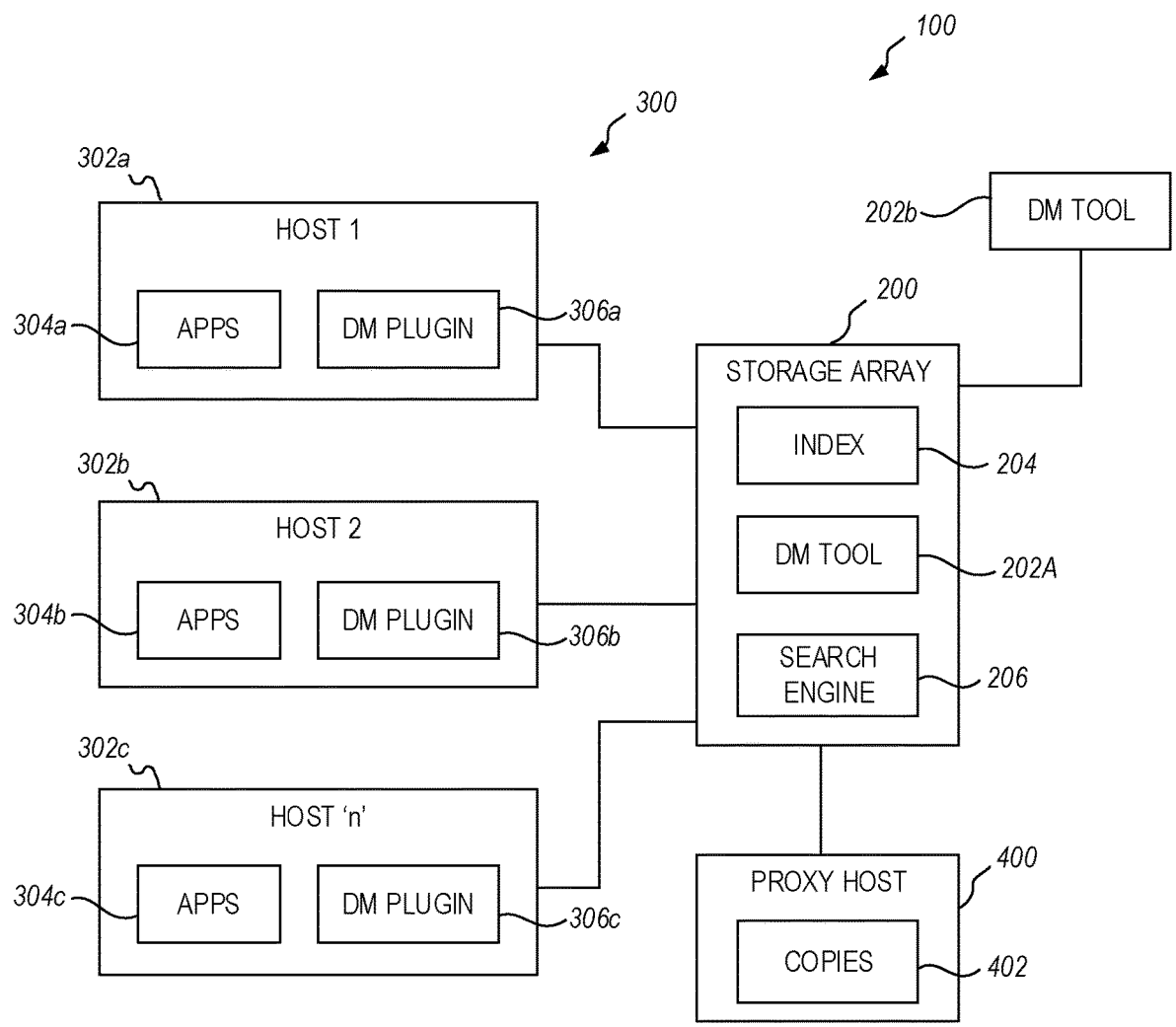
FIG. 1 discloses aspects of an example operating environment for at least some embodiments.

Embodiments of the present invention generally relate to copy data management. More particularly, at least some embodiments of the invention relate to systems, hardware, software, computer-readable media, and methods directed to the indexing of copy data.

In light of the technological problems noted herein, and others, what is needed are ways to improve data copy processes and data copies so that, for example, a user is able to readily determine what information is stored in the copies, whether particular information is stored in the copies, and the nature of information stored in the copies. Thus, at least some embodiments of the invention may fully or partially resolve one or more of the technological problems noted herein, and/or other technological problems, by providing processes for indexing data in copies such as partial backups, incremental backups, full backups, clones, snapshots, and any other type of copies of data.

It would also be useful to implement data indexing functionality in connection with a copy data management tool. The data indexing may be performed relatively close in time with creation of the copy that is to be indexed. As well, an indexed copy data repository may be implemented that enables user access to indexed copy data.

In one example embodiment, an intelligent copy data management tool is provided which integrates within a storage array to provide content index copy data functionality. This tool will use storage array capabilities to provision copy data based on organization policies, examples of which include Recovery Time Objective (RTO) and Recover Point Objective (RPO), and the tool will also be aware of snapshot differential data, such as between two different point-in-time copies for example. The tool may also work with an elastic search engine and, based on snap differential copies provided by the storage array, the tool can build an optimal and fast content indexed copy data repository which can serve as a quick lookup/search engine to perform content aware search on such copy data instances.

In some specific example embodiments of the invention, at least some functionality may be provided by, or implemented in connection with, a platform such as the Dell-EMC AppSync platform, although use of this particular platform is provided only by way of illustration and is not required. As well, other functionality can be provided by way of the Amazon Web Services (AWS) Elastic Block Storage (EBS) platform although, again, use of this particular platform is provided only by way of illustration and is not required.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in a public cloud environment such as a cloud services environment that may be, or include, a data protection system operating environment that includes one or more storage systems or storage environments including primary storage and data protection storage. The storage environment may take the form of a cloud storage environment, an on-premises storage environment, and hybrid storage environments that include public and private elements, although the scope of the invention extends to any other type of storage environment as well. More generally, embodiments of the invention can be implemented in any suitable cloud services environment and the scope of the invention is not limited to the example environments disclosed herein. Any of these cloud environments can take the form of an operating environment that is partly, or completely, virtualized. One particular example of a cloud services environment in connection with which embodiments of the invention may be employed is the AWS environment.

The storage environment may include one or more host devices that each host one or more applications used by a tenant or customer of the storage environment. As such, a particular tenant may employ, or otherwise be associated with, one or more instances of each of one or more applications. In general, the applications are not limited to any particular functionality or type of functionality. Some example applications include email applications such as MS Exchange, database applications such as SQL Server, filesystems, and datastores. One example of an application that may be used to manage application copies, and in which the functionality disclosed herein can be employed, is EMC AppSync.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a storage array 200, which can take the form of a cloud storage array for example, accessible by one or more hosts 300, such as hosts 302a, 302b and 302c for example. One, some, or all, of the hosts 302 may take the form of a VM, although that is not required. In general, the VM is a virtualization of underlying hardware and/or software and, as such, one or more of the hosts 104 may include or otherwise be associated with various underlying components.

In some instances, the storage array 200 can take the form of respective storage volumes for each of the hosts 300. Examples of such storage volumes can take the form of elastic block storage (EBS) volumes that store data at a block level, and may be created by way of applications such as the Amazon EBS platform. The storage volumes can be considered as elastic with respect to at least some of their attributes. To illustrate, attributes such as the capacity, performance, and type, of storage volume can be changed on the fly as tenant needs change. The storage volumes, which may be implemented as block level storage volumes, can be employed in any of a variety of ways. For example, a file system can be created on top of a storage volume, a database can be constructed using the storage volumes, and/or applications and data can be stored in the storage volume. In at least some embodiments, the storage volumes provide durable snapshot capabilities.

The storage volumes of the storage array 200 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage volumes can use Hard Disk Drive (HDD) storage for throughput intensive workloads that are typically measured in terms of data transfer rates such as MB/s.

In general, the hosts 300 communicate with the storage array 200 to create and store copies of data created by and/or at the direction of the hosts 300. Thus, the hosts 300 may host one or more instances of one or more applications, such as applications 304a, 304b and 304c. The applications 304a . . . 304c may include, for example, email applications such as MS Exchange, database applications such as SQL Server, filesystems, datastores, and additional or alternative applications. The scope of the invention is not limited to any particular type, number, or combination of applications. More generally, the applications 304a . . . 304c can be any application(s) that create new or modified data that is desired to be copied.

In more detail, each of the hosts 300 may include a respective instance of a data management (DM) plugin 306a . . . 306c that cooperates with a DM tool 202a or 202b to create copies of data generated in connection with the operation of the applications 304a . . . 304c. Such copies may include, for example, partial backups, incremental backups, full backups, clones, snapshots, any other type of copies of data, and any combination of the foregoing. As indicated, the DM tool 202a may reside at the storage array 200, or the DM tool 200 may reside other than at the storage array 200, as in the case of DM tool 202b, but be accessible by the storage array 200. Similarly, the search engine 206a may reside at the storage array 200, or the search engine may reside at other than the storage array 200, as in the case of search engine 206b. Except for their respective locations, the search engines 206a and 206b may be identical to each other. Likewise, except for their respective locations, the DM tool 202a and DM tool 202b may be identical to each other. Finally, search engines such as search engine 206a and 206b may be separate from, or integrated within, a corresponding DM tool, such as DM tool 202a and DM tool 202b, respectively.

In some embodiments, the DM tool 200 and its functionality may be integrated into the Dell-EMC copy data management tool AppSync. However, no particular DM tool is required to be used and, accordingly, the scope of the invention is not limited to this particular example. In other embodiments, the DM tool 200 and its functionality may be separate from, but operate in association with, a copy data management tool, one example of which is AppSync.

As further indicated in FIG. 1, the DM tool 202 of the storage array 200 may also communicate with one or more proxy hosts 400. In general, the DM tool 202 may cooperate with the proxy host 400 to mount one or more copies of data 402 at the proxy host 400. Indexing of the copies may be performed by the DM tool 200 and the resulting indexes 204 stored at the storage array 200. Finally, a search engine 206a can be employed by a user to search the indexes 204 for copy data of interest. The search engine 206a can be any suitable type and, in some embodiments, is implemented as the Elastic Search engine developed by Elastic (https://www.elastic.co/products/elasticsearch), a search and analytics engine, although the use of Elastic Search is not necessarily required.

In some embodiments, the DM tool 202, index 204, and search engine 206a may collectively comprise elements of an array element manager, or array management tool. Such an array element manager or array management tool may reside at, or be accessible by way of, the storage array 200.

B. Example Host Configuration

Figure 2:
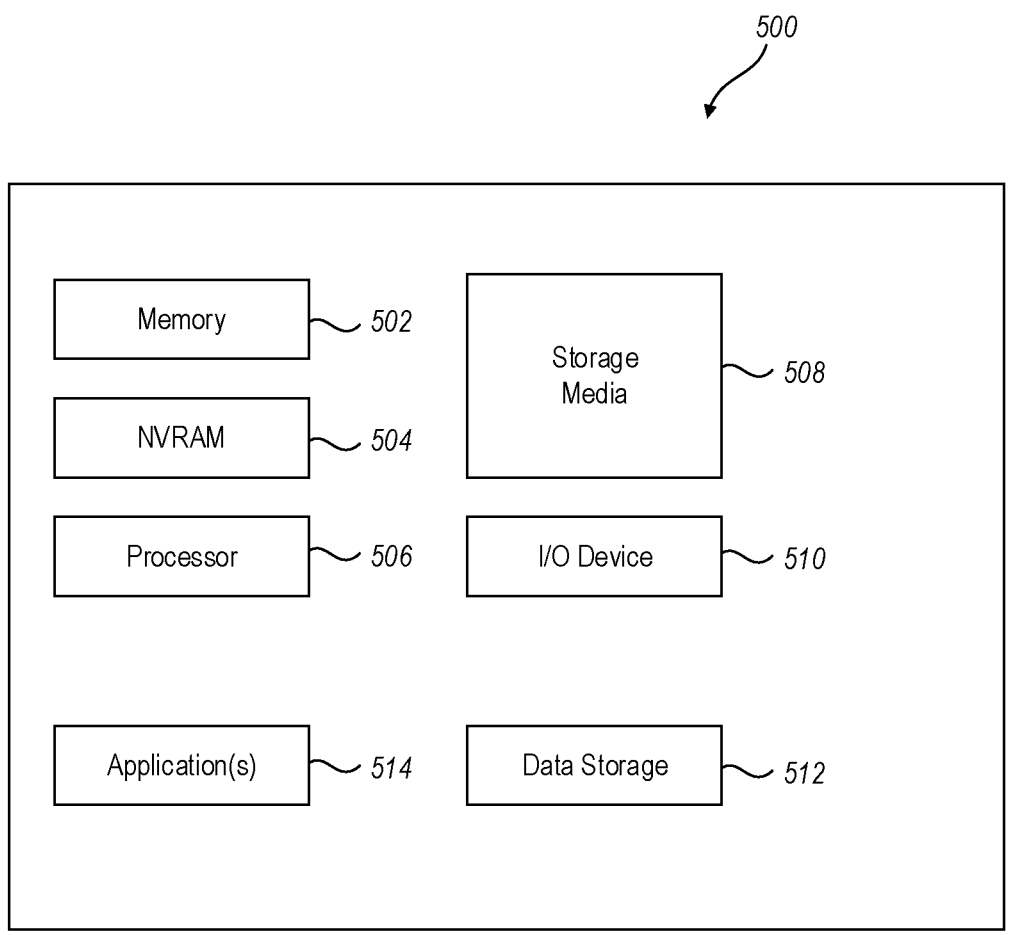
FIG. 2 discloses aspects of an example physical computing device configuration.

Turning now to FIG. 2, one or more of the storage array 200 and its components, hosts 300, and proxy host 400 can take the form of a physical computing device, one example of which is denoted at 500. As well, where any of the aforementioned elements comprise or consist of a VM, that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, I/O device 510, and data storage 512. One or more of the memory components of the physical computing device can take the form of solid state device (SSD) storage. As well, one or more applications 514 are provided that comprise executable instructions. Such executable instructions can take various forms including, for example, a DM tool, applications such as may be hosted by a host, a search engine, and a DM plugin.

C. Aspects of Some Example DM Tools

With the example operating environment 100 of FIG. 1 in view, details are now provided concerning aspects of some example methods according to various embodiments of the invention. Such methods may be performed in whole or in part in various example operating environments, including the operating environment 100.

In the following discussion, and elsewhere herein, it should be noted that embodiments of a DM tool may be implemented in various different configurations including, but not limited to, a standalone DM tool that operates in association with a copy data management tool, a copy data management tool that includes the functionality attributed herein to the DM tool, and a copy data management tool that includes an integrated DM tool. As such, any functions attributed herein to the DM tool may alternatively be performed by a copy data management tool, or by a copy data management tool that includes an integrated DM tool. Regarding this latter configuration, any of such functions may be performed solely by the integrated DM tool, or performance of such functions may be split in any manner between the integrated DM tool and the copy data management tool within which the DM tool is integrated.

Initially, data may be generated at one or more hosts, due to operation of applications at the host for example, and may be backed up at the filesystem volumes of the storage array by cooperation of a host DM plugin and the DM tool associated with the storage array. The backups may be incremental backups, snapshots, full backups, or any other type of backup. In some embodiments, the backups are deduplicated prior to storage at the storage array.

After the backups have been stored at the storage array, the DM tool may then be used to create copies of applications and/or other data that is stored in the filesystem volumes of the storage array. The copies may include applications, data, filesystems, metadata, or any combination of these, and that data included in a copy may take the form of objects, or copy data objects. The copies may, but need not be, created according to a particular schedule, that may be specified by a user. The copies can take a wide variety of forms including, but not limited to, a full copy, partial copy, snapshot, or clone. As well, creation of the copies, along with any of the other operations or functions of the DM tool, may be performed automatically, for example, in response to storage of a backup at the storage array. Part, or all, of one or more copies may take the form of a database or database file. After the copies have been created, they may be stored in one or more storage volumes at the storage array.

In at least some embodiments, a copy of a backup is created and stored based on policies such as Recovery Time Objective (RTO) and/or Recover Point Objective (RPO). As used herein, RTO refers to a target time that is set for recovery of the data after a problem has occurred, and thus indicates how quickly a recover and restore of the data must be performed. The RTO may be based, for example, on the criticality of the data to operations of a business entity. For example, if the RTO is set at 4 hours, the lost/compromised data must be recovered and restored within 4 hours of the loss.

On the other hand, RPO concerns how much data loss may be acceptable to an entity. Thus, RPO may be determined by considering the amount of time elapsed between two backups, and then determining how much data may potentially be lost between those backup times. For example, a data loss occurring immediately after the earlier of two backups would be relatively small, while a data loss occurring immediately prior to the later of the two backups would be relatively large. The RPO is a way to express how much time an entity is willing to spend trying to recover, or recreate, the lost data. As such, the RPO may serve as an input when deciding how often data will be backed up. For example, if an entity is not willing to spend more than 2 days trying to recover or recreate lost data, then the time between successive backups should be no more than 2 days.

As is apparent, the RTO and RPO metrics have different purposes. In particular, the RTO may be applied at an enterprise level for example, and as such considers the entity and its systems as a whole. On the other hand, the RPO is specifically concerned with data, and the ability of the entity to sustain a data loss.

When the copies have been created, the DM tool may use a proxy mounter host, or simply a proxy host, to mount the copy data volume from the storage array on the proxy host. After mounting, an elastic search indexing tool of the search engine may then crawl through the data of the mounted copy and create an index repository, or simply index, of the data. The index may be stored in the storage array, although that is not necessarily required. More generally, the index may be stored anywhere it is accessible by the DM tool. The search engine is able to understand and index the data of a variety of different types of databases. Some example types of data that may be indexed include, but are not limited to, file types associated with word processing documents, portable documents, spreadsheets, slide presentations, any files created in connection with components of the Microsoft Office suite of products, and any other data that may be included in a copy.

In addition to creating an index, the DM tool also associates the data objects in the copy with the index so that when the index is searched, the data objects can be identified. This association can be implemented in a variety of ways. In one embodiment, the DM tool creates a reference object between the index and an associated document, data object, or other group of data, in the copy. The reference object may include the information 'path+copy data identifier,' where the path identifies where the data object is located, and the copy data identifier is an identifier that is unique to that data object. Reference objects, or other mechanisms of comparable functionality, can take a variety of other forms as well and the scope of the invention is not limited to the aforementioned example. The reference objects can be stored together with the copy data or, alternatively, with the index with which they are associated.

The operation of the DM tool with respect to the copying and indexing processes may vary depending upon the data that is to be copied. For example, for a dataset not previously processed by the DM tool, the DM tool may copy and index the entire dataset, which may be in the form of a snapshot for example. In subsequent operations concerning that dataset, the DM tool will obtain a 'snapdiff' or data differential between the most recent snapshot and a preceding snapshot. The snap differential may be obtained, for example, by a query of the storage array for the ID of any changed data blocks, or other data units. That is, the data differential captures only the changes that have taken place between the respective times of the two snapshots and, as such, the volume of data in the data differential may be significantly smaller than the volume of data in the initial snapshot. The data changes may include data additions, data deletions, and data modifications.

Because the size of the data differential is relatively small, the copying and indexing processes may be performed relatively more quickly than they were on the initial snapshot of the dataset. For example, the DM tool maps the data differential between two copies to the region(s) of the database and file system volume which is/are impacted by the changes. In some embodiments, this mapping is a reverse mapping process in which the DM tool uses the ID of changed blocks, obtained from the storage array, to determine which part of the index is affected. The index can then be updated to map to the changed block(s). The indexing job is then run by the DM tool only on the affected region(s), which are likely to be smaller than the initial snapshot.

As noted above, a data differential may indicate that some data present in an earlier snapshot has been deleted in a subsequent snapshot. In this case, the DM tool will mark the corresponding index for deletion, that is, the index that refers to the copy data volumes that held the deleted data.

Once created, an index can then be used to facilitate a search function, such as may be performed by a user with a console located at, for example, a storage array, and/or at a host. The console may comprise, or consist of, a user interface (UI) such as a graphical user interface (GUI), or command line interface (CLI), for example, by way of which a user can enter a search string, and also by way of which the user can receive from the DM tool a listing of documents, files, and/or other datasets, that include the search string. In some embodiments, the user may select a listed dataset and the DM tool returns the dataset to the user. The user may then mount the dataset, such as at a host for example. The user may then perform a recovery and restore process, using the mounted dataset, in which the data in the mounted dataset is restored to one or more targets, such as a host for example.

In some instances, the recover and restore process may be performed by cooperation of a DM plugin with the DM tool. That is, the DM plugin may request the dataset from the DM tool, receive the dataset from the DM tool, mount the dataset locally, and then recover data from the mounted dataset and restore the recovered data to a host on which the DM plugin resides.

D. Aspects of Some Example Methods

Figure 3:
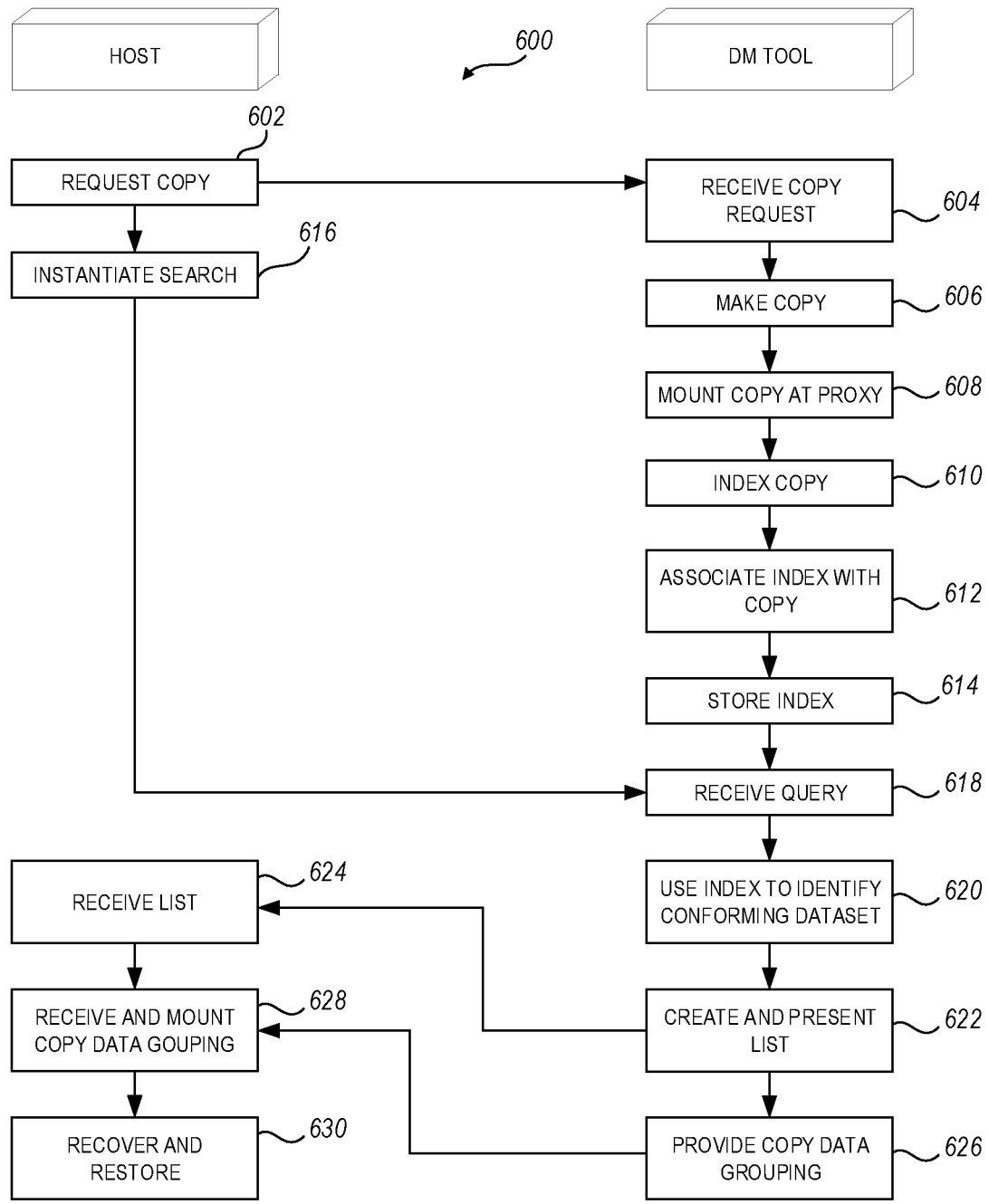
FIG. 3 discloses aspects of an example method for indexing of copy data.

With reference now to FIG. 3, methods for indexing copy data are disclosed, where one particular embodiment of a method is denoted generally at 600. In some embodiments at least, respective elements of the method 600 can be performed, either in whole or in part, by a DM tool and DM plugin.

The method 600 can begin when a host, or DM plugin of a host, requests 602 that a copy be made of a dataset. The request 602 may concern a dataset that has already been backed up at a storage array. The request 602 may be received 604 by a storage array, or DM tool of a storage array. The DM tool then makes one or more copies 606 of the dataset identified in the request 602, and the copies are mounted 608 by the DM tool at a proxy.

At this stage, the mounted copy is ready to be indexed. If the dataset has not previously been indexed, then the DM tool will index 610 the entire copy. On the other hand, if the dataset has been previously indexed, the DM tool will obtain differential information between the most recent iteration of the dataset as compared with a preceding copy of the dataset, and indexing 610 may be performed only with regard to data block changes as between the two datasets, or snapshots. Such data block changes may include addition of data blocks, deletion of data blocks, or modifications to data blocks.

Next, the index that has been created is associated 612 by the DM tool with the data blocks, data groupings, or other data units of the copy, and the index is then stored 614, such as at a storage array for example. The indexed data is now available for queries, mounting, and other processes.

Accordingly, a host may instantiate 616 a search of one or more mounted and indexed dataset copies. In some embodiments, the search may specify a string, or any other information desired to be located. A corresponding search query is then received 618 from the host at the DM tool which then uses the index to identify 620 the copy, or copies, that include files or other copy data groupings that include the string identified in the query. A list of conforming copy data groupings is then created 622 by the DM tool and transmitted to the host that initiated the query.

The host receives 624 the list of conforming copy data groupings and presents the list to a user for consideration. In some instances, the list may include a hyperlink or other connection to each listed copy data grouping. Regardless of the implementation of the list however, the user may identify a copy data grouping that is desired to be mounted locally and can request the identified copy data grouping from the storage array which then provides 626 the requested copy data grouping to the host. The host may then receive and mount 628 the copy data grouping locally. The mounted copy may then be used by the host in connection with a recover and restore process 630 in which data is recovered from the mounted copy data grouping and restored to a target device, which may be the host.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions which are executable by one or more hardware processors to perform operations comprising:
   creating a copy of a dataset, wherein the dataset comprises data generated by one or more applications at a host device;
   mounting the entire copy at a proxy host;
   after the copy is mounted at the proxy host, creating an index by indexing the entire mounted copy;
   associating the index with a portion of data in the copy by creating a reference object between the index and the portion of data;
   storing the index;
   storing the reference object with either the index or the copy;
   obtaining a data differential between the copy and a subsequent copy created after the copy, the data differential identifying one or more changed blocks that have changed between the copy and the subsequent copy;
   mapping the data differential to an affected database region and/or file system volume, and the mapping comprises a reverse mapping process comprising using respective IDs of the changed blocks to identify a portion of the index affected by changes associated with the changed blocks, and the respective IDs are obtained from a storage array at which the dataset is stored; and
   updating the index to map to the changed blocks.

2. The non-transitory storage medium as recited in claim 1, wherein the dataset that is copied is a deduplicated dataset.

3. The non-transitory storage medium as recited in claim 1, wherein the copy is one of: an incremental backup; a snapshot; a full backup; a partial backup; or, a clone.

4. The non-transitory storage medium as recited in claim 1, wherein the reference object comprises the information 'path+copy data identifier'.

5. The non-transitory storage medium as recited in claim 1, wherein updating the index is performed with respect only to regions of a database that include one or more of the changed blocks.

6. The non-transitory storage medium as recited in claim 1, wherein except for mounting of the copy at a proxy host, the operations are performed at a storage array.

7. The non-transitory storage medium as recited in claim 1, wherein creation of the copy is based on a Recovery Time Objective (RTO) and/or a Recover Point Objective (RPO).

8. The non-transitory storage medium as recited in claim 1, wherein the operations further comprise:
   in response to a user query specifying the portion of data, using the index and the reference object to identify, in the copy and/or the subsequent copy, a copy data grouping that includes the portion of data;
   creating a list that includes the copy data grouping;
   presenting the list to the user;
   receiving an indication of a user selection of the copy data grouping; and
   providing, to a host, the copy data grouping selected by the user.

9. The non-transitory storage medium as recited in claim 1, wherein the data differential indicates that some data in the copy has been deleted in the subsequent copy, and the operations further comprise marking, for deletion, an index that refers to copy data volumes that held the deleted data.

10. A method, comprising:
creating a copy of a dataset, wherein the dataset comprises data generated by one or more applications at a host device;
mounting the entire copy at a proxy host;
after the copy is mounted at the proxy host, creating an index by indexing the entire mounted copy;
associating the index with a portion of data in the copy by creating a reference object between the index and the portion of data;
storing the index;
storing the reference object with either the index or the copy;
obtaining a data differential between the copy and a subsequent copy created after the copy, the data differential identifying one or more changed blocks that have changed between the copy and the subsequent copy;
mapping the data differential to an affected database region and/or file system volume, and the mapping comprises a reverse mapping process comprising using respective IDs of the changed blocks to identify a portion of the index affected by changes associated with the changed blocks, and the respective IDs are obtained from a storage array at which the dataset is stored; and
updating the index to map to the changed blocks.

11. The method as recited in claim 10, wherein the dataset that is copied is a deduplicated dataset.

12. The method as recited in claim 10, further comprising:
in response to a user query specifying the portion of data, using the index and the reference object to identify, in the copy and/or the subsequent copy, a copy data grouping that includes the portion of data;
creating a list that includes the copy data grouping;
presenting the list to the user;
receiving an indication of a user selection of the copy data grouping; and
providing, to a host, the copy data grouping selected by the user.

13. The method as recited in claim 10, wherein the data differential indicates that some data in the copy has been deleted in the subsequent copy, and the method further comprises marking, for deletion, an index that refers to copy data volumes that held the deleted data.

14. The method as recited in claim 10, wherein the copy is one of: an incremental backup; a snapshot; a full backup; a partial backup; or, a clone.

15. The method as recited in claim 10, wherein the reference object comprises the information 'path+copy data identifier'.

16. The method as recited in claim 10, wherein indexing is performed by an elastic search indexing tool.

17. The method as recited in claim 10, wherein updating the index is performed with respect only to regions of a database that include one or more of the changed blocks.

18. The method as recited in claim 10, wherein except for mounting of the copy at a proxy host, the method is performed at a storage array.

19. The method as recited in claim 10, wherein creation of the copy is based on a Recovery Time Objective (RTO) and/or a Recover Point Objective (RPO).

* * * * *